June 30, 1970    W. J. FRIERDICH    3,518,528
GENERATOR VOLTAGE REGULATOR WITH REACTOR SENSING MEANS
Filed Oct. 20, 1967    2 Sheets-Sheet 1

June 30, 1970    W. J. FRIERDICH    3,518,528
GENERATOR VOLTAGE REGULATOR WITH REACTOR SENSING MEANS
Filed Oct. 20, 1967    2 Sheets-Sheet 2
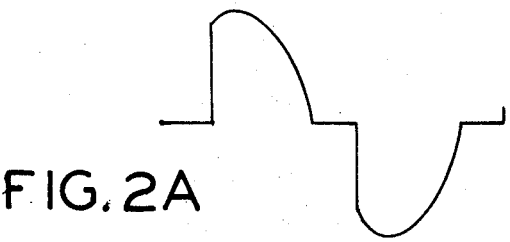
FIG. 2A
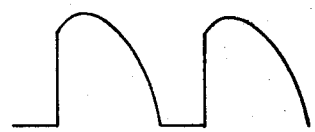
FIG. 2B
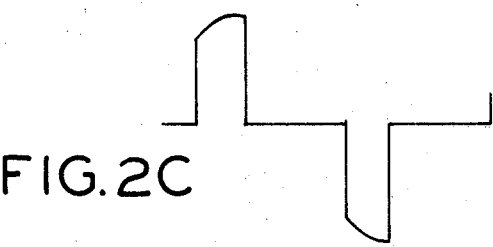
FIG. 2C
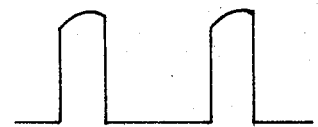
FIG. 2D
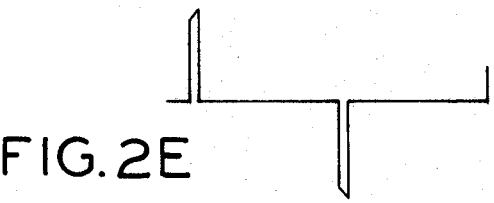
FIG. 2E
FIG. 2F
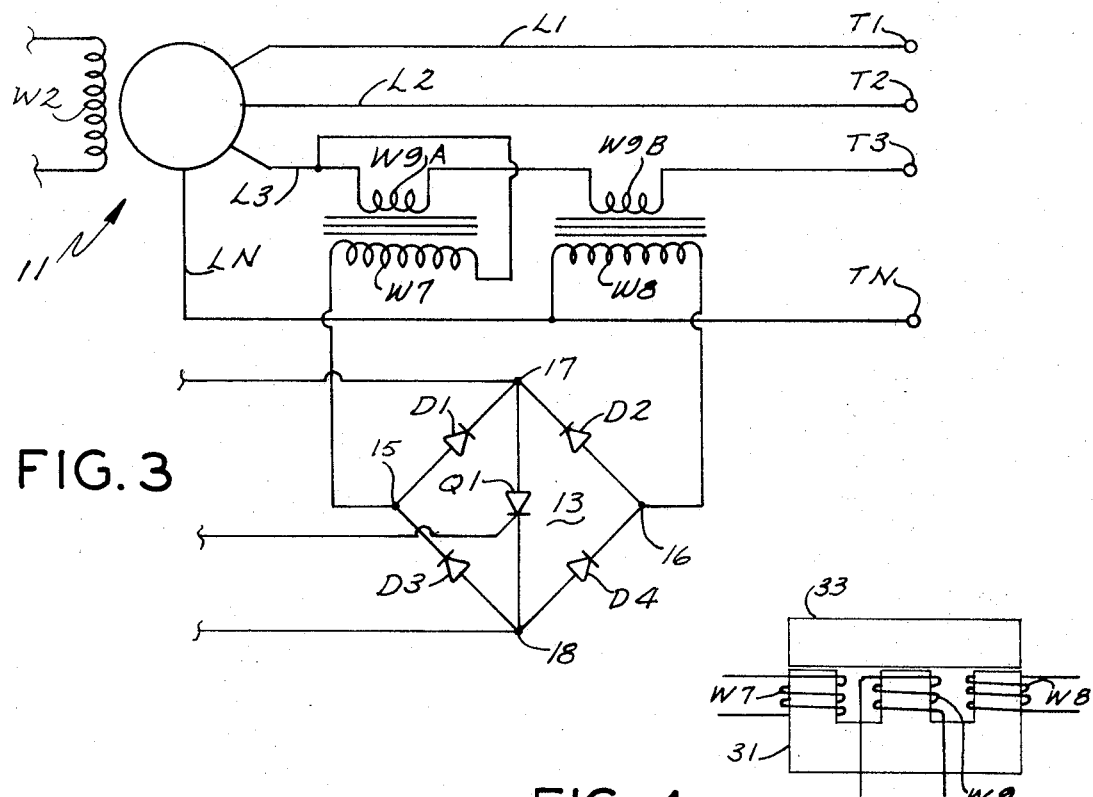
FIG. 3
FIG. 4

United States Patent Office 3,518,528
Patented June 30, 1970

3,518,528
GENERATOR VOLTAGE REGULATOR WITH REACTOR SENSING MEANS
Waldo J. Frierdich, Highland, Ill., assignor to Basler Electric Company, Highland, Ill., a corporation of Illinois
Filed Oct. 20, 1967, Ser. No. 676,758
Int. Cl. H02p 9/30, 9/38
U.S. Cl. 322—25        7 Claims

ABSTRACT OF THE DISCLOSURE

Apparatus is disclosed for regulating the output voltage of an A.C. generating system having a field winding the D.C. energization of which controls the A.C. output voltage. A full-wave bridge rectifier is energized from the output voltage through an inductor which permits the input voltage to the bridge to be dropped in relation to the system output voltage. The D.C. ouput from the bridge rectifier is applied to energize the field winding and the field winding is shunted by an SCR (silicon controlled rectifier) which selectively shunts current away from the winding thereby to vary its energization. The duty cycle of the SCR is controlled as a function of the system output voltage thereby to maintain the output voltage at a preselected level.

BACKGROUND OF THE INVENTION

This invention relates to voltage regulating apparatus and more particularly to apparatus for maintaining at a preselected level the A.C. output voltage of an A.C. generating system having a field winding the D.C. energization of which controls the A.C. output voltage.

Various regulating systems have been manufactured previously for generating systems of the type described above. Certain types of these prior art regulators incorporate substantial numbers of relatively expensive and bulky magnetic components which are operated at relatively high power levels and which must be tailored to the characteristics of the particular generating system. Other types energize the field winding through semiconductor current control devices such as SCRs which are effectively connected in series with the field winding. These devices draw heavy currents for short periods and thus can create substantial radio frequency interference. Also, if such a semiconductor shorts, control of the system output voltage may be lost and the voltage may abruptly rise above the desired level. Further, these latter systems often require an auxiliary starting system, switched in by means of relays, to build up to full output voltage from the residual generator output voltage because the semiconductor devices typically will not operate to energize the field winding at the relatively low, residual voltage levels.

SUMMARY OF THE INVENTION

Among the several objects of the present invention may be noted the provision of apparatus for maintaining at a preselected level the output voltage of an A.C. generating system having a field winding the D.C. energization of which controls the A.C. output voltage of the system; the provision of such apparatus which does not require a substantial number of magnetic power components; the provision of such apparatus which is self-starting from residual generator output voltage; the provision of such apparatus which minimizes the generation of radio frequency interference; and the provision of such apparatus in which failures of semiconductor components will not cause an abrupt rise in the system output voltage. Other objects and features will be in part apparent and in part pointed out hereinafter.

Briefly, regulating apparatus of this invention is useful with an A.C. generating system including an A.C. generator having a field winding the D.C. energization of which controls the A.C. output voltage of the generator. The apparatus includes rectifier means for providing D.C. for energizing the field winding and a voltage dropping impedance connected in series with the rectifier means across the system output voltage. A triggerable semiconductor current switching device is connected across the field winding for selectively shunting current away from the field winding and conduction through that device is varied in response to the amplitude of the system output voltage thereby to maintain the output voltage at the preselected level.

BRIEF DESCRIPTION OF THE DRAWINGS

FIGS. 2A–2F are traces representing voltage waveforms occurring within the circuit of FIG. 1 under various load conditions;

FIG. 3 is a partial schematic circuit diagram of an A.C. generating system employing another embodiment of regulating apparatus of this invention; and FIG. 4 is a diagrammatic illustration of the construction of an inductor employed in the embodiment of FIG. 3.

Corresponding reference characters indicate corresponding parts throughout the several views of the drawings.

DESCRIPTION OF THE PREFERRED EMBODIMENTS

Figure 1:
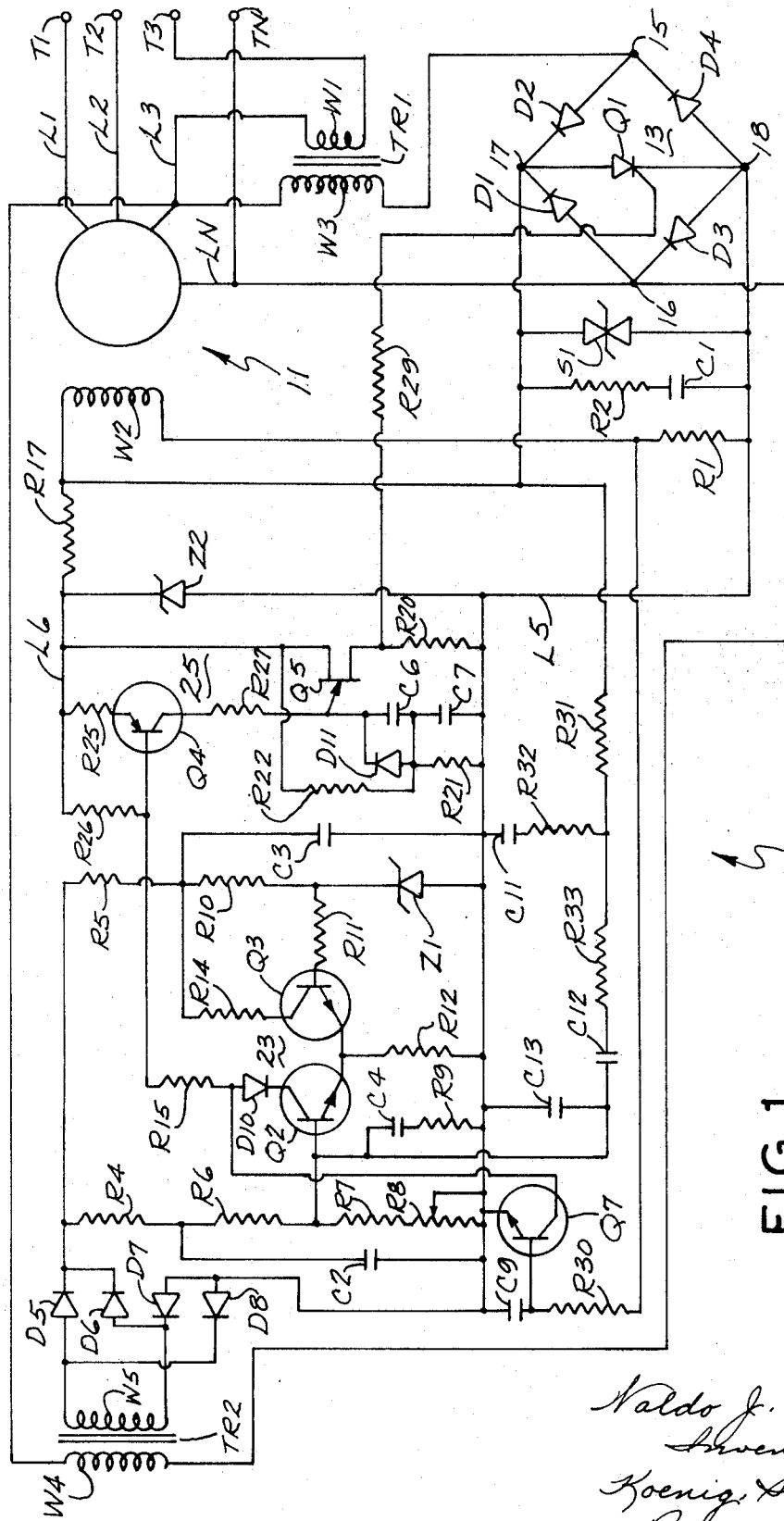
FIG. 1 is a schematic circuit diagram of an A.C. generating system employing voltage regulating apparatus of this invention.

Referring now to FIG. 1, a three-phase A.C. generator is indicated generally at 11. A single phase generator may also be used. The generator 11 is connected to three output leads L1, L2 and L3, there being one output lead for each of the three phases, and to a neutral or ground lead LN. These leads are connected to respective output terminals T1–T3 and TN by means of which the generator may be connected to various load circuits. A current sensing winding W1 is interposed in the lead L3 between generator 11 and terminal T3 for a purpose described hereinafter.

Generator 11 includes a field winding W2 the D.C. energization of which controls or affects the amplitude of the A.C. output voltage from the generator. Winding W2 may, for example, be the excitation winding for a conventional brushless rotary exciter for generator 11. Winding W2 is energized from a full wave bridge rectifier designated generally at 13. Bridge 13 comprises four diodes D1–D4 which are interconnected in conventional manner between a pair of A.C. input terminals 15 and 16 and a pair of D.C. output terminals 17 and 18. One end of the field winding W2 is connected directly to the D.C. output terminal 17 and the other end of the winding is connected to the other D.C. output terminal 18 through a resistor R1. A lead L5 which constitutes the D.C. neutral or ground lead is also connected to terminal 18.

The output voltage of generator 11 is applied to bridge 13 to energize it and for this purpose the A.C. input terminal 16 is connected directly to lead LN and the other A.C. input terminal 15 is connected, through an inductor winding W3, to the lead L3. As is described in greater detail hereinafter, the inductance of winding W3 allows a voltage drop to be developed between the output lead L3 and the bridge input terminal 15. Other types of impedances may also be used for this purpose. Windings W1 and W3 are inductively coupled to each other thereby comprising a transformer TR1. The coupled windings are phased so that load current, drawn through winding W1, increases the A.C. input to the bridge rectifier 13.

The D.C. output terminals 17 and 18 of bridge 13 and the field winding W2 are shunted by the anode-cathode circuit of an SCR (silicon controlled rectifier) Q1. Thus, when the SCR conducts, the output current from the bridge will be shunted away from the field winding and substantially the entire instantaneous output voltage provided at lead L3 will appear across the winding W3. Other types of current control or triggerable current switching devices may be used in place of the SCR.

Conduction through SCR Q1 is controlled by a firing circuit indicated generally at 21. This firing circuit varies the duty cycle of SCR Q1 in response to the output voltage of generator 11 to maintain that output voltage at a preselected level. A suppressor S1 and a network comprising a resistor R2 and a capacitor C1 are connected across the anode-cathode circuit of SCR Q1 for shunting high frequency transients generated by the firing of the SCR.

Current for energizing part of the firing circuit 21 is taken from between leads L3 and LN and is applied to the primary winding W4 of a transformer TR2. The transformer includes a secondary winding W5 which energizes a full bridge rectifier comprising diodes D5–D8. The pulsating D.C. thereby obtained is applied to a first filter comprising a resistor R4 and a capacitor C2 and a second filter comprising a resistor R5 and a capacitor C3. The D.C. voltage developed across capacitor C2 is applied to a voltage divider comprising a pair of resistors R6 and R7 and a rheostat R8. The junction between resistors R6 and R7 is connected to the base of one (Q2) of a pair of NPN transistors Q2 and Q3 which are interconnected as a differential amplifier designated generally as 23. As will be understood by those skilled in the art, the voltage provided at the junction between resistors R6 and R7 is a D.C. voltage which varies as a function of or is substantially proportional to the A.C. output voltage of generator 11 provided between leads L3 and LN and thus this D.C. voltage may be employed as a feedback signal which represents the A.C. output voltage. The base of transistor Q2 is also shunted to ground through a capacitor C4 and a resistor R9.

The voltage on capacitor C3 is applied, through a resistor R10, to a Zener diode Z1 to provide a substantially constant voltage source. This constant voltage is applied, through a resistor R11, to the base of the other transistor (Q3) of the pair of transistors comprising the differential amplifier. The emitters of transistors Q2 and Q3 are connected directly together and to the D.C. ground lead L5 through a resistor R12. The collector of transistor Q3 is connected to the filter capacitor C3 through a load resistor R14 and the collector of transistor Q2 is connected, through a diode D10 and a resistor R15, to the base of a PNP transistor Q4 which comprises part of a phase-angle control circuit indicated generally at 25.

The phase-angle control circuit 25 is energized with pulsating D.C. from the bridge rectifier 13 together with the field winding W2. The pulsating D.C. from the bridge rectifier is applied, through a dropping resistor R17, to a Zener diode Z2 which clips this pulsating voltage to a D.C. level suitable for transistor circuitry. This clipped voltage is applied to a lead L6. The base-two terminal of a unijunction transistor Q5 is connected directly to lead L6 and its base-one terminal is connected to the ground lead L5 through a load resistor R20. The emitter terminal of unijunction transistor Q5 is connected to lead L5 through a pair of capacitors C6 and C7. Capacitor C6 is shunted by a diode D11 and capacitor C7 is shunted by a resistor R21. Capacitor C7 is charged through a resistor R22 when a positive voltage is provided at lead L6. The emitter of PNP transistor Q4 is connected to lead L6 through a resistor R25 and its base is connected to this same lead through a bleed resistor R26. The collector or output terminal of transistor Q4 is connected to the emitter of unijunction transistor Q5 through a resistor R27.

As is understood by those skilled in the art, unijunction transistor Q5 will fire and generate a sharp voltage pulse across resistor R20 when the voltage at the emitter of the unijunction transistor reaches a voltage threshold which depends upon the intrinsic standoff ratio of the transistor. The base-one terminal of transistor Q5 is connected, through a resistor R29, to the gate of SCR Q1 so that the SCR is trigged into conduction by this voltage pulse. When SCR Q1 is fired, the voltage across its anode-cathode circuit, that is, the D.C. output voltage from bridge rectifier 13, drops to nearly zero. The D.C. supply to the phase control circuit through lead L6 is thus cut off and thus it can be seen that the unijunction transistor Q5 will fire only once during each A.C. half cycle.

As is understood by those skilled in the art, the resistor R1 provides a voltage signal which is proportional to the current flowing through field winding W2. This signal is applied, through a resistor R30, to the base of an NPN transistor Q7. The emitter of transistor Q7 is connected directly to the D.C. ground lead L5 and the base-emitter circuit of transistor Q7 is shunted by a capacitor C9. The collector of transistor Q7 is connected to the junction between resistor R15 and diode D10 and thus, through the resistor R15, to the base of transistor Q4. Thus current conducted through the collector-emitter circuit of transistor Q7 is added to that conducted through the collector-emitter circuit of the differential amplifier transistor Q2 in driving transistor Q4.

The positive or energized side of winding W2 is connected, through a compensating network comprising resistors R31–R33 and capacitors C11–C13, to the base of transistor Q2 of the differential amplifier to provide a stabilizing effect as is understood by those skilled in the art. The values of these components are chosen with respect to the response characteristics of the particular generator with which the voltage control apparatus illustrated is employed.

The operation of this apparatus is substantially as follows. When the generator 11 is initially started, the residual voltage provided between leads L3 and LN is, after rectification, applied to the field winding W2 to increase the output of the generator. The generator output voltage thus builds up rapidly. It should be noted that this build up does not depend upon the firing of the SCR Q1 or upon the operation of any of the transistor control circuitry. Accordingly, no auxiliary starting system is required.

As the output voltage of the generator builds up toward the desired level, the D.C. feedback signal applied to the base of transistor Q2 approaches the voltage level provided by the Zener diode D1 so that transistor Q2 is gradually driven into conduction. Conduction in transistor Q2 forward biases transistor Q4. Accordingly, when a positive voltage is applied to lead L6 on each half cycle of the rectified A.C. or pulsating D.C. provided by rectifier bridge 13, the capacitor C6 will be charged by transistor Q4 at a rate which depends upon the generator output voltage. Accordingly, the time within each half cycle at which the voltage at the emitter of unijunction transistor Q5 reaches the firing threshold will also depend upon the generator output voltage. The values of capacitor C6 and the other elements of this circuit are chosen so that the firing threshold is reached well within the half cycle period when the generator output voltage is equal to the desired level. When the unijunction firing threshold is reached, the voltage pulse generated across resistor R20 triggers SCR Q1 into conduction. Conduction through the anode-cathode circuit of SCR Q1 shunts the field winding W2 thereby cutting off the voltage applied to this winding. The SCR thus functions as a current control device for selective shunting current away from the field winding.

As the time or phase angle of firing of unijunction transistor Q5 varies as a function of the feedback signal, it can be seen by those skilled in the art that the duty cycle of or average conduction through SCR Q1 varies as a function of the output voltage of the generator. As the average energization of the field winding controls the A.C. output voltage of generator 11 as noted previously, it can be seen that a so-called proportional control of the generator output voltage is provided which tends to maintain this output voltage at a preselected level. The particular level which is maintained can be adjusted by varying rheostat R8 to vary the amplitude of the feedback signal in relation to the fixed voltage provided by the Zener diode Z1.

FIGS. 2A, 2C and 2E represent the wave forms present at the A.C. input terminals 17 and 18 of bridge 13 under different load conditions while FIGS. 2B, 2D and 2F represent wave forms generated at the D.C. output terminals 15 and 16 of the bridge under the same respective conditions. When the output voltage of generator 11 is low, SCR Q1 is not fired and a situation exists as illustrated in FIGS. 2A and 2B. The notch in the early part of each sine-wave half-cycle is caused by the inductance of the winding W2 which comprises the main load on the rectifier bridge 13. A current previously induced in this winding tends to keep flowing, due to inductive reactance and thus causes the diodes constituting bridge 13 to be forward biased by the winding current until the supply current can build up to a level equal to the preexisting winding current. When the generator output voltage is low and the situation illustrated in FIGS. 2A and 2B exists, the field winding W2 is driven by the supply voltage during the entire remainder of each A.C. half cycle.

When the generator output voltage is at the desired level and some intermediate energization of the field winding W2 is required to maintain that level, the SCR Q1 is fired at an intermediate time or phase within each A.C. half cycle as is illustrated in FIGS. 2C and 2D. After the SCR fires, the voltage at the output terminals 17 and 18 drops substantially to a zero level thereby cutting off the driving voltage from the field winding. Since the supply voltage to transistors Q4 and Q5 is also cut off by the firing of the SCR Q1 as noted previously, the operation of transistor Q5 is thus synchronized with the A.C. half cycles and thus for a given set of output voltage and load conditions, the SCR Q1 is fired at the same time or phase angle within each A.C. half cycle.

If the generator output voltage should tend to exceed the desired level, the firing time of SCR Q1 is advanced by the increased rate of charging of capacitor C6 as described earlier. Thus, a driving voltage is applied to winding W2 only for a short period during each A.C. half cycle as is illustrated in FIG. 2F. Thus, true proportional feedback over a wide range of conditions is obtained. As compared with regulators employing magnetic components, the system illustrated provides both a wider range of response and a faster speed of response. Further, the system parameters do not need to be tailored to the particular generating system but rather one regulator can be used in a variety of systems.

In the exemplary circuit, the SCR Q1 is commutated naturally when the anode-cathode voltage drops substantially to zero between A.C. half cycles but it should be understood that other types of commutation, e.g., by employing a second SCR, may also be used.

As electrical loading is applied to terminals T1–T3 and TN, the A.C. current drawn through winding W1 causes an increased input to the full-wave bridge rectifier 13. The system illustrated is thus to a certain degree self-compensating or self-regulating for variations in load and thus the range of control which must be exercised by the proportional control feedback system is reduced. Further, the power derived from winding W1 will provide energization of the field winding even when the output terminals are shorted thereby preventing a collapse of the generating system.

To prevent the generator 11 from being overloaded, the field current applied to winding W2 is limited through the operation of resistor R1 and transistor Q7. When the field current reaches a predetermined level which is sufficient to forward bias transistor Q7, conduction through this transistor causes increased conduction in transistor Q4. Increased conduction through transistor Q4 in turn causes an SCR Q1 to fire earlier thereby effectively placing a limit on the current which can be drawn through field winding W2. In this way, resistor R1 and transistor Q4 provide means for increasing conduction through SCR Q1 when the current through field winding W2 exceeds a predetermined level. The parameters are typically chosen to limit the peak current to about 300% of rated capacity.

It should be noted that if the SCR Q1 should fail by shorting, the system output voltage does not rise abruptly as would occur with a series connected current control member but rather the system output voltage will fall off or drop to zero since the shorted element will shunt the field winding.

In the embodiment illustrated in FIG. 1, the self-compensation for increasing loads and the short circuit protection provided by winding W1 is effective only if the current drawn through lead L3 is representative of the overall load on the generator. To provide for such self-compensation on various other possible combinations of unbalanced load the transformer TR1 may include an additional primary winding in series with one of the other output leads L1 or L2. If all combinations of unbalanced loads are to be covered, however, a multiple phase rectifier bridge should be used and separate current transformers should be used for the different output leads L1–L3 so that cancellation between the different phases does not occur.

In the embodiment illustrated in FIG. 3, the A.C. input terminals 15 and 16 of rectifier bridge 13 are energized from leads L3 and LN through a pair of secondary windings W7 and W8 each of which provides an inductive reactance between the bridge and the respective generator output lead. A pair of current sensing windings W9A and W9B are coupled to windings W7 and W8 to provide self-compensation for loading as described previously with reference to FIG. 1. This circuit has the advantage that high frequency transients induced by the firing of SCR Q1 are isolated from the generator output terminals by the inductive impedances provided by windings W7 and W8 and thus radio frequency interference and similar effects are minimized.

The transformers comprising windings W7, W8, and W9A, W9B may be advantageously combined and constructed as a single inductive unit by employing conventional so-called EI core laminations as illustrated in FIG. 4. The windings W7 and W8 are wound on the outer legs of an E-shaped lamination 31 and the load current carrying windings W9A and W9B are combined to form a winding W9 which links the center leg of lamination 31. The magnetic circuits are then closed by an I-shaped lamination 33. The inductive values of windings W7 and W8 can be adjusted by providing appropriate magnetic gaps between the laminations.

In view of the above it will be seen that the several objects of the invention are achieved and other advantageous results attained.

As various changes would be made in the above constructions without departing from the scope of the invention, it is intended that all matter contained in the above description or shown in the accompanying drawings shall be interpreted as illustrative and not in a limiting sense.

What is claimed is:

1. In an A.C. generating system including an A.C. generator for supplying A.C. to a set of output leads, said generator having a field winding the D.C. energization of which controls the A.C. output voltage of the generator; regulating apparatus for controlling the energization of said field winding to maintain said A.C. output voltage at a preselected level, said apparatus comprising:

- rectifier means having A.C. input terminals and D.C. output terminals for providing D.C. for energizing said field winding;
- circuit means including a first reactor winding in series with said input terminals for applying said output voltage to said input terminals of said rectifier means thereby to energize said field winding in response to the amplitude of said output voltage, said reactor winding providing a voltage drop;
- a second reactor winding magnetically coupled to said first reactor winding and connected in series with one of said output leads thereby to energize said field winding in response to the magnitude of the current drawn from said generator through said one lead;
- a triggerable semiconductor current switching device connected across said field winding for selectively shunting current away from said field winding; and
- means for varying the duty cycle of said current switching device in response to said generator output voltage thereby to maintain said output voltage at said preselected level.

2. Apparatus as set forth in claim 1 wherein said rectifier means comprises a full-wave bridge rectifier.

3. Apparatus as set forth in claim 2 wherein said switching device comprises an SCR.

4. Apparatus as set forth in claim 3 wherein said means for varying the duty cycle of said current switching device comprises means for triggering said SCR at a phase angle which varies as a function of said A.C. output voltage.

5. Apparatus as set forth in claim 3 including means for increasing conduction through said SCR when the current through said field winding exceeds a predetermined level.

6. Apparatus as set forth in claim 3 further comprising a third reactor winding in series with said input terminals, one of said first and third reactor windings being connected on each side of said A.C. input terminals thereby to reduce radio frequency interference in said A.C. output voltage.

7. Apparatus as set forth in claim 6 wherein said first and third reactor windings are wound over respective legs of a single magnetic core and said second reactor winding is wound over another leg of said core.

References Cited

UNITED STATES PATENTS

| | | | |
|---|---|---|---|
| 3,151,288 | 9/1964 | Avizienis et al. | 322—28 |
| 3,369,171 | 2/1968 | Lane | 322—68 |
| 3,388,315 | 6/1968 | Yarrow | 322—68 X |

ORIS L. RADER, Primary Examiner

H. HUBERFELD, Assistant Examiner

U.S. Cl. X.R.

322—28, 68, 73